(12) United States Patent
Karthikesan

(10) Patent No.: US 10,360,150 B2
(45) Date of Patent: Jul. 23, 2019

(54) TECHNIQUES FOR MANAGING MEMORY IN A MULTIPROCESSOR ARCHITECTURE

(75) Inventor: Nikanth Karthikesan, Bangalore (IN)

(73) Assignee: Suse LLC, Wilmington, DE (US)

( * ) Notice: Subject to any disclaimer, the term of this patent is extended or adjusted under 35 U.S.C. 154(b) by 908 days.

(21) Appl. No.: 13/026,447

(22) Filed: Feb. 14, 2011

(65) Prior Publication Data
US 2012/0210065 A1    Aug. 16, 2012

(51) Int. Cl.
*G06F 12/02* (2006.01)
*G06F 12/0806* (2016.01)

(52) U.S. Cl.
CPC ...... *G06F 12/0806* (2013.01); *G06F 12/0284* (2013.01); *G06F 2212/2542* (2013.01); *G06F 2212/272* (2013.01)

(58) Field of Classification Search
CPC ............. G06F 12/0284; G06F 12/0806; G06F 2212/2542; G06F 2212/272
See application file for complete search history.

(56) References Cited

U.S. PATENT DOCUMENTS

| | | | |
|---|---|---|---|
| 6,101,576 A * | 8/2000 | Kobayashi et al. | 711/122 |
| 6,108,684 A * | 8/2000 | DeKoning | G06F 9/505 718/100 |
| 2002/0065998 A1 | 5/2002 | Buckland | |
| 2002/0129115 A1 | 9/2002 | Noordergraaf et al. | |
| 2003/0009623 A1 | 1/2003 | Arimilli et al. | |
| 2003/0009643 A1 | 1/2003 | Arimilli et al. | |
| 2003/0217216 A1 | 11/2003 | Rowlands | |
| 2005/0066121 A1 * | 3/2005 | Keeler | 711/113 |
| 2005/0144223 A1 * | 6/2005 | Yang | G06F 12/0866 711/122 |
| 2006/0112252 A1 * | 5/2006 | Dixon | 711/170 |
| 2007/0186757 A1 * | 8/2007 | Yagi | 84/616 |
| 2007/0282968 A1 | 12/2007 | Rowlands | |
| 2008/0052331 A1 * | 2/2008 | Ogawa et al. | 707/205 |
| 2008/0184000 A1 * | 7/2008 | Kawaguchi | 711/165 |
| 2008/0196030 A1 | 8/2008 | Buros et al. | |
| 2009/0248959 A1 * | 10/2009 | Tzeng | G06F 12/08 711/103 |
| 2010/0211756 A1 | 8/2010 | Kaminski et al. | |

* cited by examiner

*Primary Examiner* — Aracelis Ruiz
(74) *Attorney, Agent, or Firm* — Schwegman Lundberg & Woessner, P.A.

(57) ABSTRACT

Techniques for managing memory in a multiprocessor architecture are presented. Each processor of the multiprocessor architecture includes its own local memory. When data is to be removed from a particular local memory or written to storage that data is transitioned to another local memory associated with a different processor of the multiprocessor architecture. If the data is then requested from the processor, which originally had the data, then the data is acquired from a local memory of the particular processor that received and now has the data.

18 Claims, 3 Drawing Sheets

TECHNIQUES FOR MANAGING MEMORY IN A MULTIPROCESSOR ARCHITECTURE

BACKGROUND

Advances in memory management and processor performance have permitted more and more complicated software applications to be utilized in the industry. Also, these advances have permitted multiple applications to run simultaneously on the same hardware architecture.

Initially, the technology advancements were realized via hardware and software improvements that created a single logical machine from multiple cooperating processors (multiprocessor architectures). However, it was soon realized that additional design improvements were needed to fully utilize the potential of multiprocessor architectures.

One design improvement was the implementation of Non-Uniform Memory Access techniques or a Non-Uniform Memory Architecture (NUMA). With NUMA, memory access time depends on a particular memory's location relative to a requesting processor (in a multicore architecture). So, a processor can access its own local memory much faster than non-local memory (such as: non-volatile storage, memory local to a different processor, memory shared between processors, etc.).

One problem associated with NUMA approaches is that data is discarded from local memory of a particular processor when that processor needs to retain some other data in its local memory and there is not enough room to retain both. However, the discarded data may still be needed by the local processor that had to discard it.

Another problem with NUMA approaches is that dirty data (data that has to be written to disk (non volatile storage)) requires the processor to expend Input/Output (I/O) disk reads and writes to move the dirty data from local memory to disk and this can substantially impact processor performance for other waiting operations.

Essentially, with NUMA approaches each local memory is independently managed and operated by its particular processor. There is no cooperation between the processors and their local memories. Therefore, some local memories tend to be underutilized whereas other local memories are over utilized. This creates imbalances within the multicore architecture that can degrade memory and processor performances over time.

SUMMARY

Techniques for managing memory in a multiprocessor architecture are presented. More particularly, and in an embodiment, a method for managing local memory in a multiprocessor system is described.

More particularly, a local memory for a first processor of a multiprocessor system is detected as having reached a threshold capacity level. A second memory is then identified, which is local to a second processor of the multiprocessor system and which has excess capacity. Finally, the data is offloaded from the local memory of the first processor to the second memory, which is local to the second processor, thereby increasing capacity of the local memory and decreasing capacity of the second memory.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

A "local memory" refers to volatile memory or cache hardware that is local to a particular processor of a multiprocessor system (multicore architecture). That is, each processor of the multicore processor system has its own local cache memory that provides that particular processor with fast data access.

In an embodiment, the techniques described herein and below are integrated as enhancements to Non-Uniform Memory Access techniques of Non-Uniform Memory Architectures (NUMA).

Various embodiments of this invention can be implemented in existing operating architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured and programmed to specifically perform the processing of the methods and systems presented herein. Moreover, the methods and systems are implemented, reside, and are programmed within a non-transitory computer-readable storage media or machine-readable storage medium and are processed on the machines configured to perform the methods. Also, as used herein, a "machine" and "processor" refer to a physical computing device, such as a "multicore processor machine."

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
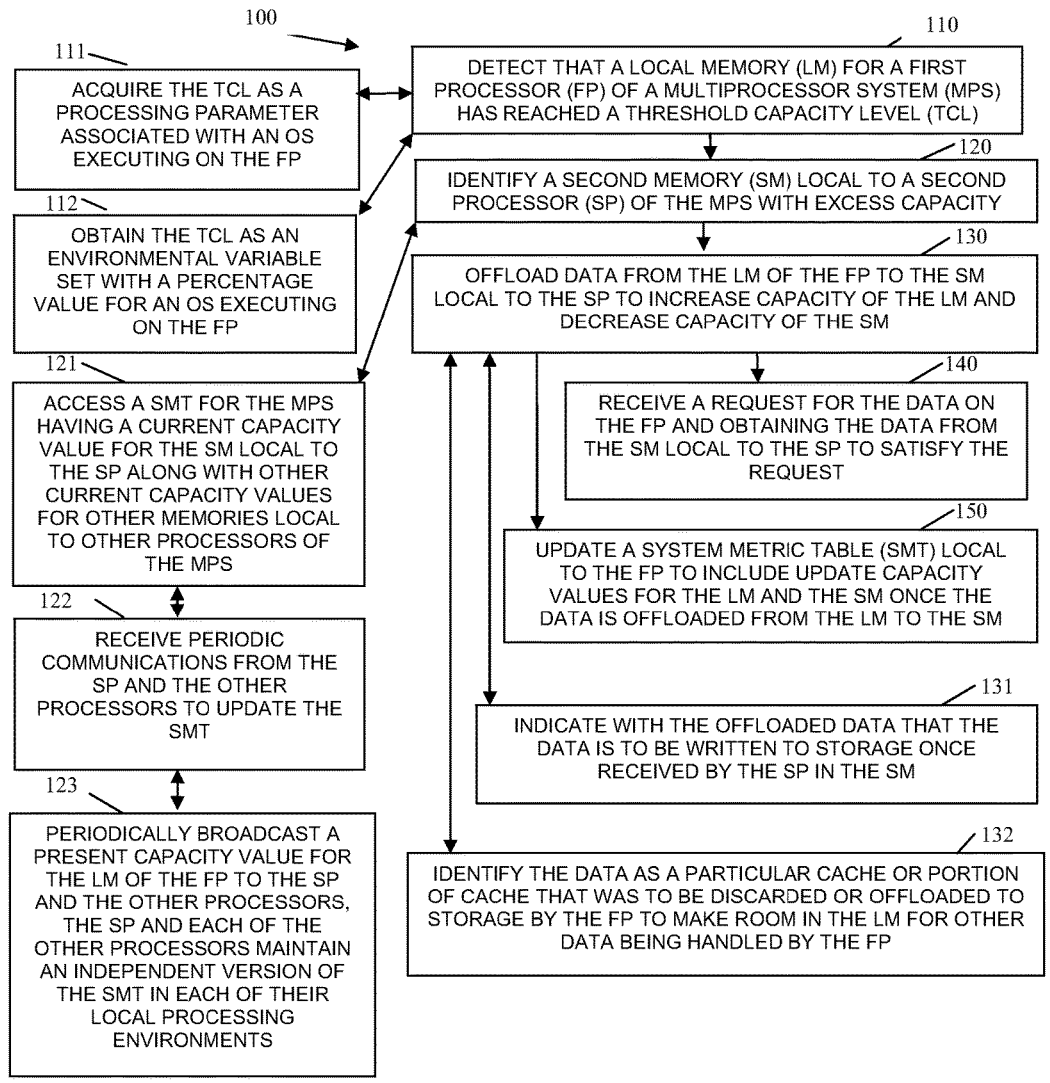
FIG. 1 is a diagram of a method for managing local memory in a multiprocessor system, according to an example embodiment.
Figure 2:
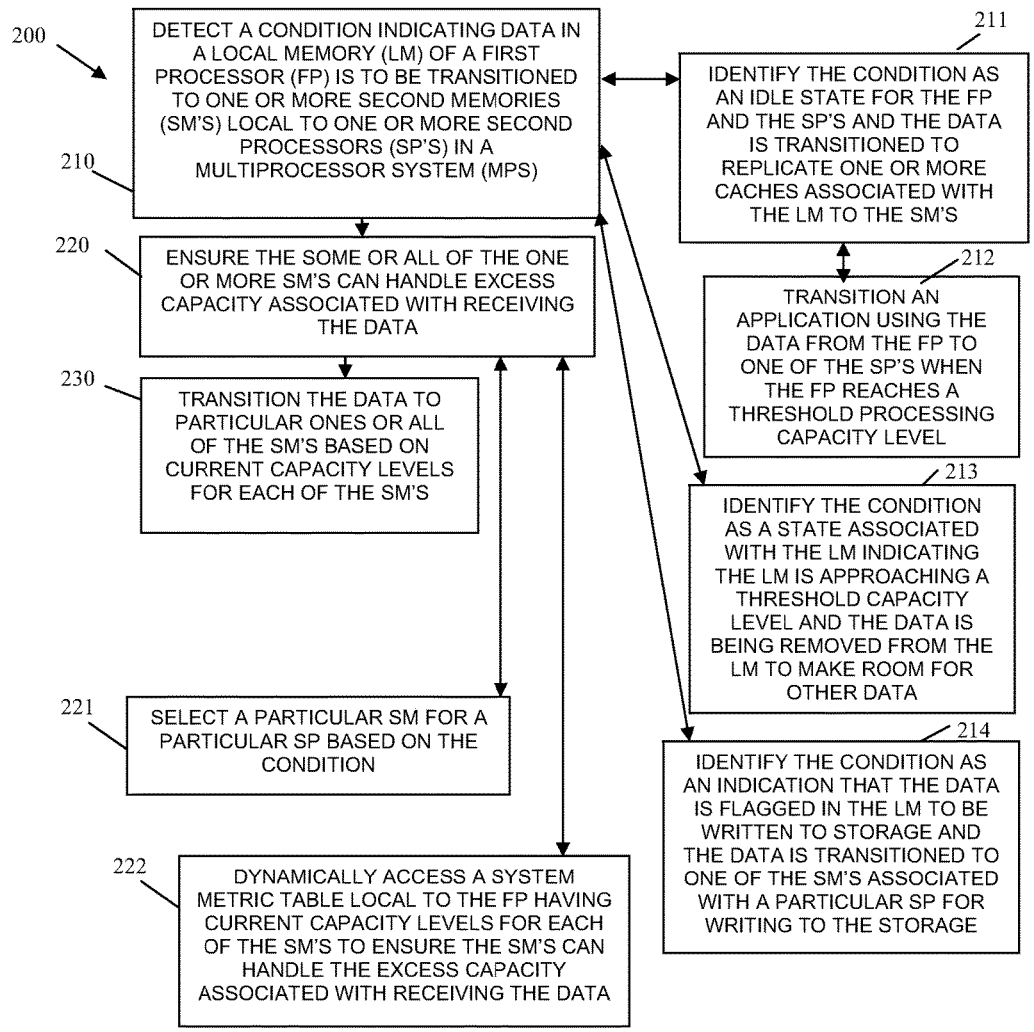
FIG. 2 is a diagram of another method for managing local memory in a multiprocessor system, according to an example embodiment.
Figure 3:
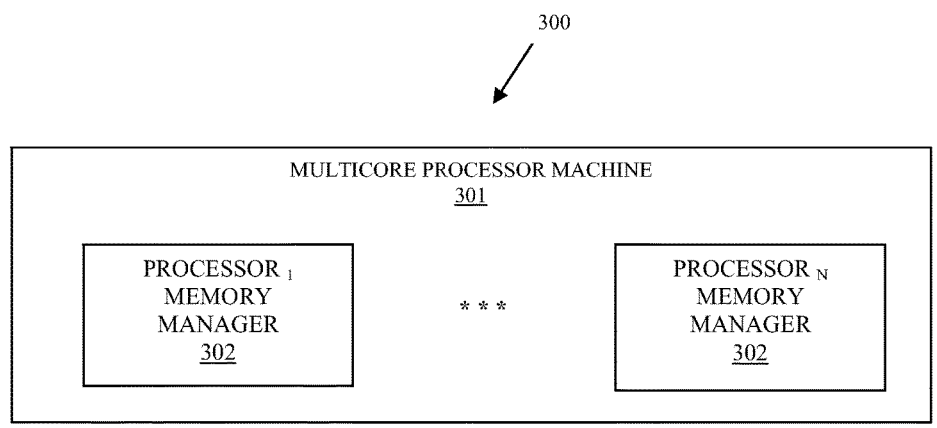
FIG. 3 is a diagram a multiprocessor local memory management system, according to an example embodiment.

It is within this context that embodiments of the invention are now discussed within the context of FIGS. 1-3.

FIG. 1 is a diagram of a method 100 for managing local memory in a multiprocessor system, according to an example embodiment. The method 100 (hereinafter "local memory manager") is implemented in a machine-accessible and non-transitory computer-readable medium as instructions that execute on one or more processors and are programmed within the one or more processors (machines, computers, processors, etc.). The machines are specifically configured and programmed to process the local memory manager. Furthermore, the local memory manager can be operational over and process within a network. Any such network may be wired, wireless, or a combination of wired and wireless.

In an embodiment, the local memory manager is implemented as part of a kernel for an operating system that executes on a multicore processor machine (multiprocessor system).

At 110, the local memory manager detects that a local memory (local cache) for a first processor of a multiprocessor system has reached a threshold capacity level. The local memory is physically local to the first processor and its processing environment within the multiprocessor system. The threshold capacity level is a value, such as a percentage value representing the load or usage of the local memory that is considered to be high or in need of reducing.

According to an embodiment, at 111, the local memory manager acquires the threshold capacity level as a processing parameter for an operating system that executes on the first processor. So, processing parameters for booting up the operating system can identify the value to be associated with the threshold capacity level.

In another case, at 112, the local memory manager obtains the threshold capacity level as an environmental variable set with a percentage value for an operating system executing on the first processor. Here, one or more scripts that execute when the operating system is initiated can set a particular environmental variable as the percentage, which is used as the threshold capacity level.

At 120, the local memory manager identifies a second memory, which is local to a second processor of the multiprocessor system, as having excess capacity. Detection and identification of the second processor and the second memory can occur in a variety of manners.

For example, at 121, the local memory manager accesses a system metric table maintained for the multiprocessor system. The system metric table includes an identifier for the second processor and its second memory (which is local to second processor and not the first processor). The entry in the system metric table for the second processor and the second memory also includes a current capacity value for usage and capacity of the second memory. The system metric table also includes other entries for other memories that are local to other processors of the multiprocessor system.

Continuing with the embodiment of 121 and at 122, the local memory manager receives periodic communications from the second processor and the other processors that allows the local memory manager to update and manage the system metric table.

Still continuing with the embodiment of 122 and at 123, the local memory manager periodically broadcasts a present capacity value for the local memory of the first processor to the second processor and the other processors. The second processor and each of the other processors, which comprise the multiprocessor system, maintain an independent version of the system metric table in each of their local processing environments. In this way, the processors of the multiprocessor system cooperate, via the system metric table, to manage their own local memory in conjunction with the other processors. This level of cooperation for local memory management is not present in NUMA implementations in the industry.

At 130, the local memory manager offloads data from the local memory of the first processor to the second memory, which is local to the second processor. This is done to increase capacity of the local memory (by removing the data) and also decrease capacity of the second memory (by adding the data).

According to an embodiment, at 131, the local memory manager indicates with the offloaded data that the data is to be written to non-volatile storage once received by the second processor in the second memory. Here, dirty data that needs to be flushed to storage can suck up processing cycles of the first processor, so the data that is to be flushed is passed off to the second processor to handle from its second memory (local to the second processor). This is useful when the second processor is idle or has very little processing load relative to the first processor.

In another scenario, at 132, the local memory manager identifies the data as a particular cache or a particular portion of a cache, which was going to be discarded or offloaded to storage by the first processor to make room in the local memory of the first processor for other data being handled by the first processor. In this way, when the data that is transitioned to the second processor, via the second memory, is needed again by the first processor it can be more efficiently (faster) acquired via communication with the second processor than it can be acquired by I/O reads from storage. This improves the processing throughput of the first processor and load balances local memories of the multiprocessor system.

In an embodiment, at 140, the local memory manager receives a subsequent request for the data on the first processor from an application processing on the first processor. The data is detected as missing from the first processor and is acquired from the second processor via its second memory for purposes of satisfying the request. Again, this inter-processor communication with access to each processor's local memory is much more efficient than having a processor issue an I/O read from non-volatile storage.

In another situation, at 150, the local memory manager updates a system metric table, which is local to the first processor, for purposes of including updated capacity levels for the local memory and the second memory (of the second processor) once the data is successfully offloaded from the local memory to the second memory. Usage of the system metric table to keep track of memory capacity utilization was discussed above with respect to the embodiments of 121-123. Here, updates are made to show the capacity of the local memory for the first processor is increased once the data is migrated to the second memory of the second processor and to show the capacity of the second memory is correspondingly decreased.

FIG. 2 is a diagram of another method 200 for managing local memory in a multiprocessor system, according to an example embodiment. The method 100 (hereinafter "cache manager") is implemented in a machine-accessible and non-transitory computer-readable medium as instructions that execute on one or more processors and are programmed on the one or more processors (machines, computers, processors, etc.). The machine is specifically configured and programmed to process the cache manager. Furthermore, the cache manager can be operational over and process within a network. Any such network may be wired, wireless, or a combination of wired and wireless.

The cache manager presents another and in some cases an enhanced perspective of the local memory manager represented by the method 100 of the FIG. 1.

At 210, the cache manager detects a condition that indicates data in a local memory (local cache) of a first processor is to be transitioned to one or more second memories that are local to one or more second processors in a multiprocessor system. Each second memory is local or is a local cache to a particular one of the second processors.

In an embodiment, at 211, the cache manager identifies the condition as an idle state for the first processor and the second processors. The condition is associated with an action that instructs the cache manager to replicate one or more caches associated with the local memory to the second memories associated with the second processors.

Continuing with the embodiment of 211 and at 212, the cache manager subsequently transitions an application, which is using the data, from the first processor to one of the second processors, when the first processor reaches a threshold processing capacity level. So, replication of local caches can occur over the multiprocessor system and when a node (processor) becomes loaded, an application can be automatically transitioned to another node (second processor) for improved processing throughput and data access.

In another case, at 213, the cache manager identifies the condition as a state associated with the local memory. The state indicates that the local memory is approaching a threshold capacity level and that the data is being removed from the local memory of the first processor to make room for other data that the first processor needs to handle. This scenario was described in detail above with reference to the method 100 of the FIG. 1.

In yet another situation, at 214, the cache manager identifies the condition as an indication that the data is flagged in the local memory to be written to storage and the data is being transitioned to one of the second memories associated with a particular second processor so that the particular second processor can write the data to storage. Again, this situation was also described above with reference to the method 100 of the FIG. 1 at 131-132.

At 220, the cache manager ensures that some or all of the one or more second memories can handle excess capacity associated with receiving the data. Again, this can be resolved in a variety of manners.

For example, at 221, the cache manager selects a particular second memory for a particular second processor based evaluation of the condition and any instructions or actions identified with the condition.

In another case, at 222, the cache manager dynamically accesses a system metric table local to the first processor. The system metric table includes current capacity levels (memory utilization and space availability) for each of the second memories. This is done to ensure the second memories can handle the excess capacity associated with receiving the data.

It is also noted that in addition to memory utilization and space availability, the cache manager can evaluate the condition and/or policies that also take into account the current processing load for each of the second processors. In this way, the data is not transitioned to a loaded processor even when that processor has excess capacity in its local memory.

At 230, the cache manager transitions the data to particular ones or all of the second memories based on current capacity levels for each of the second memories. That is, the cache manager keeps track of current memory utilization for each of the processors of the multiprocessor system and selects one or more of the second processors based on current memory utilization for those second processors.

FIG. 3 is a diagram a multiprocessor local memory management system 300, according to an example embodiment. The multiprocessor local memory management system 300 is implemented within a multicore processor machine. The machine is specifically configured and programmed to process aspects of the multiprocessor local memory management system 300. Furthermore, the multiprocessor local memory management system 300 can be operational over and process within a network. Any such network may be wired, wireless, or a combination of wired and wireless.

In an embodiment, the multiprocessor local memory management system 300 implements, inter alia, the methods 100 and 200 of the FIGS. 1 and 2, respectively.

The automatic multiprocessor local memory management system 300 includes a multicore processor machine 301 and a plurality of memory managers 302. Each of these components and their interactions with one another will now be described below in turn.

The multicore processor machine 301 includes multiple processors acting in concert with one another to for a multiprocessor architecture or multiprocessor system.

The multicore processor machine 301 is configured with and programmed with the memory managers 302. That is, each processor of the multicore processor machine 301 includes an instance of a particular memory manager 302. Each memory manager 302 is implemented and programmed within a non-transitory computer-readable storage medium and the multicore processor machine 301 is configured to execute the process managers 302 on each of its processors.

Example aspects of the memory managers 302 were described in detail above with reference to the methods 100 and 200 of the FIGS. 1 and 2, respectively.

Each memory manager 302 is configured to monitor capacity for local memory associated with each memory manager's 302 processor. Moreover, each memory manager 302 is also configured to migrate or transition data from its local memory to another processor's local memory based on policy evaluation and in view of current capacity levels associated with the local memories. This processing was described above in detail with respect to the methods 100 and 200 of the FIGS. 1 and 2, respectively.

The policies can define conditions for when data is to be migrated from one processor's local memory to another processor's local memory. The conditions also utilize the current capacity levels known for each local memory. In some cases, when the processors are idle data replication can occur, such that one or more caches associated with particular processors and their local memories are replicated to one or more of the remaining processors and their local memories. This scenario was discussed above with respect to the method 200 of the FIG. 2.

According to an embodiment, each memory manager 302 is also configured to maintain a system metric table for updating the current capacity levels of each local memory.

Continuing with the previous embodiment, each memory manager 302 is also configured to broadcast an existing capacity level for its local memory to other instances of the memory managers 302 so that each of the other instances of the memory managers 302 can update its system metric table with the existing capacity level. In this way, each memory manager 302 is aware of usage and load occurring on the remaining memory mangers 302 via its copy of the system metric table.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:

detecting, by a kernel process of an Operating System (OS), that a local memory for a first processor of a multiprocessor system has reached a threshold capacity level;

identifying, by the kernel processing, a second memory local to a second processor of the multiprocessor system with excess capacity by accessing a system metric table that includes a second processor identifier for the second processor, a second memory identifier for the second memory of the second processor, and a current usage value representing a current capacity of the second memory; and offloading, by the kernel process, data from the local memory of the first processor to the second memory local to the second processor through inter-processor communications between the first processor and the second processor to increase capacity of the local memory and decrease capacity of the second memory based on the system metric table having the current usage value for the second memory, wherein the local memory and the second memory are volatile memories, wherein offloading the data further includes providing, by the first processor, the offloaded data from the local memory to the second processor for temporary storage in the second memory and instructing the second processor to write the offloaded data to non-volatile storage on behalf of the first processor when the second processor is experiencing less processing load relative to the first processor.

2. The method of claim 1 further comprising, receiving, by the kernel process, a request for the data on the first processor and obtaining the data from the second memory local to the second processor to satisfy the request.

3. The method of claim 1 further comprising, updating, by the kernel process, the system metric table local to include update capacity values for the local memory and the second memory once the data is offloaded from the local memory to the second memory.

4. The method of claim 1, wherein detecting further includes acquiring the threshold capacity level as a processing parameter associated with the OS executing on the first processor.

5. The method of claim 1, wherein detecting further includes obtaining the threshold capacity level as an environmental variable set with a percentage value for the OS executing on the first processor.

6. The method of claim 1, wherein identifying the second memory further includes accessing the system metric table for the multiprocessor system having the current usage value for the second memory local to the second processor along with other current capacity values for other memories local to other processors of the multiprocessor system.

7. The method of claim 6, wherein accessing further includes receiving periodic communications from the second processor and the other processors to update the system metric table.

8. The method of claim 7 further comprising, periodically broadcasting a present capacity value for the local memory of the first processor to the second processor and the other processors, the second processor and each of the other processors maintain an independent version of the system metric table in each of their local processing environments.

9. The method of claim 1, wherein offloading the data further includes identifying the data as a particular cache or portion of cache that was to be discarded or offloaded to storage by the first processor to make room in the local memory for other data being handled by the first processor.

10. A method implemented in a non-transitory machine-readable storage medium and processed by one or more processors configured to perform the method, comprising:

detecting, by a kernel processing of an Operating System (OS), a condition indicating data in a local memory of a first processor is to be transitioned to one or more second memories local to one or more second processors in a multiprocessor system, wherein the local memory and the one or more second memories are volatile memories;

ensuring, by the kernel process, the some or all of the one or more second memories can handle excess capacity associated with receiving the data; and transitioning, by the kernel process, the data to particular ones or all of the second memories based on current capacity levels for each of the second memories based a system metric table that includes second processor identifiers for the second processors, second memory identifiers for the second memories, and current usage values for each of the second memories and by identifying a threshold capacity level for the local memory and each of the second memories during a boot of the first processor and the one or more second processors, wherein transitioning further includes offloading some of the data in the local memory to the one or more second memories when the one or more second processors are experiencing less processing loads than the first processor based on the current usage values from the system metric table and through inter-processor communications between the first processor and the one or more second processors on the multicore processor system that is a multicore processor machine, and writing, by the one or more second processors, that data to non-volatile storage and removing, by the one or more second processors, that data from the one or more second memories once written to the non-volatile storage.

11. The method of claim 10, wherein detecting further includes identifying the condition as an idle state for the first processor and the second processors and the data is transitioned to replicate one or more caches associated with the local memory to the second memories.

12. The method of claim 11 further comprising, transitioning an application using the data from the first processor to one of the second processors when the first processor reaches the threshold processing capacity level.

13. The method of claim 10, wherein detecting further includes identifying the condition as a state associated with the local memory indicating the local memory is approaching a threshold capacity level and the data is being removed from the local memory to make room for other data.

14. The method of claim 10, wherein ensuring further includes selecting a particular second memory for a particular second processor based on the condition.

15. The method of claim 10, wherein ensuring further includes dynamically accessing the system metric table having the current usage values for each of the second memories to ensure the second memories can handle the excess capacity associated with receiving the data.

16. A multi-processor implemented system, comprising:
a multicore processor machine having multiple processors; and
the multicore processor machine configured with and to execute a memory manager on each of the processors;
each memory manager configured to execute as a kernel process within an Operating System (OS), and each memory manager configured to monitor capacity for local memory associated with each memory manager's processor through a system metric table that includes an identifier for each processor, an identifier for each local memory, and a current usage value for each local memory, wherein each memory manager is also configured to migrate data from its local memory to another processor's local memory based on policy evaluation in view of current usage values for the local memories and a threshold capacity level, wherein the local memories are volatile memories, and wherein at least one processor provides some data from that processor's local memory to a different processor when the different processor is experiencing less processing load than that at least one processor, and the different processor receives that data in the different processor's local memory, writes that data to non-volatile storage, and removes that data from the different processor's local memory through inter-processor communications between the at least one processor and the different processor on the multicore processor machine.

17. The system of claim 16, wherein the each memory manager is to maintain a particular system metric table for updating the current usage values.

18. The system of claim 17, wherein each memory manager is to broadcast an existing capacity level for its local memory to other instances of the memory managers so each of the other instances of the memory managers can update its system metric table current usage values with the existing capacity level for each of the processors.

* * * * *